(12) United States Patent
MacNicol et al.

(10) Patent No.: US 6,691,101 B2
(45) Date of Patent: Feb. 10, 2004

(54) DATABASE SYSTEM PROVIDING OPTIMIZATION OF GROUP BY OPERATOR OVER A UNION ALL

(75) Inventors: Roger D. MacNicol, Bedford, MA (US); Steven A. Kirk, Chelmsford, MA (US); Xiqing Li, Westford, MA (US)

(73) Assignee: Sybase, Inc., Dublin, CA (US)

( * ) Notice: Subject to any disclaimer, the term of this patent is extended or adjusted under 35 U.S.C. 154(b) by 185 days.

(21) Appl. No.: 10/068,253

(22) Filed: Feb. 4, 2002

(65) Prior Publication Data

US 2002/0198872 A1 Dec. 26, 2002

Related U.S. Application Data

(60) Provisional application No. 60/300,234, filed on Jun. 21, 2001.

(51) Int. Cl.[7] .............................................. G06F 17/30
(52) U.S. Cl. ................................................ 707/2; 707/3
(58) Field of Search ........................... 707/3, 2, 104.1, 707/203, 10

(56) References Cited

U.S. PATENT DOCUMENTS

| 5,546,576 A | * | 8/1996 | Cochrane et al. | 707/2 |
| 5,598,559 A | * | 1/1997 | Chaudhuri | 707/2 |
| 5,659,725 A | * | 8/1997 | Levy et al. | 707/3 |
| 5,857,180 A | * | 1/1999 | Hallmark et al. | 707/2 |
| 5,897,632 A | * | 4/1999 | Dar et al. | 707/2 |

* cited by examiner

Primary Examiner—Diane D. Mizrahi
(74) Attorney, Agent, or Firm—John A. Smart

(57) ABSTRACT

A database system providing improved methods for optimization and execution of queries aggregating information from multiple database tables is described. The improved method breaks serial operations into a group of child operations that can be individually optimized and processed in parallel. A query including a grouping operator over a union node is split by pushing the grouping operation down into each input arm of the union node. Specifically, grouping operators are inserted into each child arm of qualifying union nodes, enabling separate physical database tables to be summarized in parallel. Each of the child grouping operators concurrently groups data and generates summary results in parallel, taking advantage of capabilities of available parallel processing hardware. The aggregate operators of the original master grouping operator are modified to accept and correctly synthesize sub-aggregated results generated by each of the child grouping operators. The method also enables individual optimization of operations on each database table, including use of advantageous index-only execution plans.

46 Claims, 8 Drawing Sheets

DATABASE SYSTEM PROVIDING OPTIMIZATION OF GROUP BY OPERATOR OVER A UNION ALL

RELATED APPLICATIONS

The present application is related to and claims the benefit of priority of the following commonly-owned provisional application(s): application Ser. No. 60/300,234 (Docket No. SYB/0070.01), filed Jun. 21, 2001, entitled "Database System Providing Optimization of Group By Operator Over a Union All", of which the present application is a non-provisional application thereof. The disclosure of the foregoing application is hereby incorporated by reference in its entirety, including any appendices or attachments thereof, for all purposes.

COMPUTER PROGRAM LISTING APPENDIX

A Computer Program Listing Appendix is included with this application.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to data processing environments and, more particularly, to system and methods for improved optimization and execution of queries accessing information stored in multiple physically separate database tables.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

One purpose of a database system is to answer decision support queries and support transactions. A query may be defined as a logical expression over the data and the data relationships set forth in the database, and results in identification of a subset of the database. For example, a typical query might be a request, in SQL syntax, for data values corresponding to all customers having account balances above required limits. During query processing, a database system typically utilizes one or more indexes to answer queries. Indexes are organized structures associated with the data to speed up access to particular data values (i.e., answer values). Indexes are usually stored in the database and are accessible to a database administrator as well as end users. The basic operation of database systems, including the syntax of SQL (Structured Query Language), is well documented in the technical, trade, and patent literature; see, e.g., Date, C., *An Introduction to Database Systems*, Volume I and II, Addison Wesley, 1990; the disclosure of which is hereby incorporated by reference.

"Data warehouse" systems represent a type of database system optimized for supporting management decision making by tracking and processing large amounts of aggregate database information—that is, the data warehouse. Data warehouses contain a wide variety of data that present a coherent picture of business conditions at a single point in time. Development of a data warehouse includes development of systems to extract data from operating systems plus installation of a warehouse database system that provides managers flexible access to the data. A well-known example of a data warehouse system is Sybase® Adaptive Server® IQ (ASIQ), available from Sybase, Inc. of Dublin, Calif.

A data warehousing system typically handles large pools of historical information representing different portions of a business. These different portions may, for example, represent a number of different geographical areas, such as information relating to sales in France, Italy, Germany, and other countries or regions. The information may also represent different periods of time, such as sales in October, November, December, and so forth. A number of different products and/or business units may also be involved. Frequently, such a large quantity of information is involved that in order to store the information it must be broken down into segments that are maintained in a number of separate database tables. For example, one table may contain information regarding sales in France in December. Another table may have all sales in Italy in January. Separate tables may be created based upon geography, time period, business unit and various other factors.

Because of the large quantities of information involved in a typical data warehouse, a database administrator will typically divide the information among multiple database tables rather than including all of the information in a single table. One reason an administrator will usually avoid placing a large quantity of information into a single table is that the time taken to load to an index is a logarithmic function of the size of the table. Adding one million rows into an empty table is 100 times quicker than adding one million rows into a table that already has 100 million rows in it. An index on a 100 million-row table is quite large and adding to this index requires changing a considerable number of database pages. Thus, if an administrator is continuously loading large quantities of information on a weekly or monthly basis, it is much more efficient for the administrator to load information into a number of separate, physically smaller tables (with physically smaller indexes) than to load the information into a single large table which requires a large index to be updated. Besides enabling faster loading and indexing, the use of multiple tables also enables back up and restore operations to be handled more efficiently. For example, a manager may wish to maintain information in a data warehouse for a certain period of time (e.g., 12 months of sales data). Once a new month has been loaded in to the warehouse, an old month (e.g., the same month of the prior year) is dropped. Dropping one-twelfth of the rows from a large physical table is a very expensive operation, in terms of system performance, because it requires updating a very large index containing a large quantity of data. On the other hand, if the information is maintained in monthly tables, then the warehouse can be updated by simply dropping the tables for the old month.

Storing information in a number of separate, physically smaller tables means that one frequently has to bring multiple tables together in order to generate reports for business analysis, data mining, financial planning, or similar purposes. For example, if one stores a physical table of sales in France by week, a report that provides a view of an entire calendar quarter requires the joining of approximately thirteen weekly tables. This is typically accomplished by a SQL UnionAll operation to merge together these separate tables. An administrator may simply create a database view called "Q1" or "First Quarter" that looks and feels to a user of the data warehouse as if the information is stored in a single table. A user may have no knowledge that behind the scenes the administrator has chosen to store the underlying information in multiple separate tables. The user simply interacts with an object called Q1 to obtain access to the information. The problem is that if the user is summarizing information (which is implemented by the SQL GroupBy clause), the process of summarizing all of the rows that fall within a particular group requires bringing all the rows together into the summary (a physical group) before the results may be returned to the user. If the information is stored in separate tables, this means that one is required to sequentially drain all of the separate physical tables into this single summary (i.e., scanning each physical table in turn row by row to generate the result) before the summarized result is returned to the user. In other words, a serial operation is required in order to build the summary table.

In a data warehouse environment that is processing large quantities of information, this type of serial operation results in a considerable performance penalty. Analysts or other users of the data warehouse system may be delayed considerably in receiving answers to their queries. This delay makes the type of ad-hoc analysis that is typical in a data warehouse environment much less efficient and, therefore, more difficult to conduct. Adding to this problem is the fact that many businesses purchase large machines with multiple CPUs for data warehouse processing. These businesses expect this type of multiple CPU machine to return results quickly because of its ability to process information in parallel. However, because the above-described summarizing operation remains largely a serial operation, it does not take advantage of the power and capabilities of parallel processing hardware.

Current data warehouse systems may be able to process the Where clause of a query (i.e., the selection criteria) in parallel on multiple physically separate tables. However, current systems then proceed to drain (or scan) each of the rows that met the selection criteria serially in order to form a result. Typically, in executing this type of query a temporary buffer is created and the rows meeting the selection criteria are placed into the temporary buffer. Generating a result requires sequentially scanning all of the rows of the temporary buffer by first loading the buffer of rows selected from the first physical table into summarizing area, then loading the buffer of rows selected from second physical table into the summarizing area, and so forth, until all responsive data is loaded into a summary table in the summarizing area. This serial operation may mean a considerable delay in return of the results to users. Besides taking too long, this type of serial operation also fails to fully utilize the power of parallel processing hardware.

Another problem resulting from the separation of data into multiple physical tables is that this separation typically precludes use of "index-only" query plans. If all of the data is loaded into a single table, with one index that spans all of the data, then there are classes of summary queries that can be answered using only what is in the index. These index-only plans are very efficient as they do not require access to the underlying database tables to answer a query, rather the query can be satisfied solely from key values in the index. In current systems, this type of query is not possible when the data is split amongst multiple physical tables because an index is not capable of answering a summary query involving information in a set of separate physical tables. Accordingly, once information has been broken into multiple separate physical tables, use of these efficient index-only execution plans is precluded in current systems.

Current systems have attempted to address the above problems inherent in storing information in separate tables by using the concept of "materialized views." This approach involves executing a summarizing query offline and storing the results in a persistent temporary table. Materialized views may be used when an administrator knows in advance that a particular summarizing query will be used. When the optimizer subsequently receives that particular query (e.g., a set summary over specific data), the optimizer accesses the results stored in the temporary table to generate a response. However, this approach of using a cached version of a persistent view is only useful for a pre-defined query (i.e., where the specific query is known in advance). This may be useful for things like a standard monthly or quarterly report prepared for business executives on a regular basis. However, it is not useful for data mining or ad-hoc analysis. Data mining or ad-hoc analysis involves following hunches, taking different views of information, and exploring business data differently in order to gain a better understanding about a business. A data miner often wants to look at the same information several different ways to see what happens when certain variables are changed. The preplanned, canned approach of materialized views is not useful for this type of ad-hoc analysis.

Users in data warehousing environments need an improved method for making data in multiple physically separate tables available for ad-hoc analysis and data mining. They require an approach that makes data available for exploration in a manner that takes advantage of the parallel processing capabilities of today's multiple CPU machines. Ideally, the approach will also enable use of efficient index-only query execution plans with information that is stored in physically separate tables with separate indexes. The present invention fulfills these and other needs.

GLOSSARY

The following definition is offered for purposes of illustration, not limitation, in order to assist with understanding the discussion that follows.

SQL: SQL stands for Structured Query Language, which has become the standard for relational database access, see e.g., Melton, J. (ed.), *American National Standard ANSI/ISO/IEC 9075-2: 1999, Information Systems—Database Language—SQL Part2: Foundation*, the disclosure of which is hereby incorporated by reference. For additional information regarding SQL in database systems, see e.g., Date, C., *An Introduction to Database Systems, Volume I and II*, Addison Wesley, 1990, the disclosure of which is hereby incorporated by reference.

SUMMARY OF THE INVENTION

Traditional query execution plans for grouping and aggregating queries in prior art systems involve serial operations that may cause a processing bottleneck when large quantities of data are stored in multiple separate database tables. Although data from several tables may be scanned in parallel in one step of the traditional method, subsequent grouping and aggregation steps run sequentially. The fact that the grouping and aggregation operations run sequentially, rather than in parallel, not only delays the return of query results, but also fails to utilize the capabilities of available parallel processing hardware.

The present invention includes a system providing improved methods for optimization and execution of queries aggregating information in multiple database tables. The improved method of the present invention breaks serial operations into a group of child operations that can be individually optimized and processed in parallel. The method of the present invention splits the grouping operation over a union node by pushing the grouping operation down into each input arm of the union node. Specifically, GroupBy operators are inserted into each child arm of qualifying UnionAll nodes, enabling separate physical database tables to be summarized in parallel. Each of the child GroupBy nodes concurrently groups data and generates summary results in parallel, taking advantage of available parallel processing hardware. The aggregate operators of the original master GroupBy node are modified to accept and correctly synthesize sub-aggregated results generated by each of these child nodes.

The improved methodology of pushing GroupBy nodes down into each arm of the UnionAll node enables the grouping and aggregation operation to be performed in parallel on each segment of the data. In addition to creating parallelism, query optimization is also improved as the optimizer can individually create an optimal plan for how to summarize each arm of the union node. For example, a plan may involve hash-based summarizing on one arm and sort-based summarizing on another arm depending on the query and the size of the tables involved. The methodology also includes determining whether efficient "index-only" query execution plans can be used for particular arms to more efficiently handle the query. The system of the present invention examines each of the child GroupBy nodes of the modified query tree to determine if one or more of the GroupBy nodes can be converted into index-only plans on individual arms. The examination evaluates whether an index-only plan can be substituted in a particular node and, if so, whether or not it is advantageous (i.e., more efficient) to do so. An index-only plan is substituted in nodes where an index-only plan is valid and provides greater efficiency in executing the query. Breaking large serial operations into a series of smaller operations that can be individually optimized and processed in parallel takes advantage of the capabilities of available parallel processing hardware and optimizes system performance.

DETAILED DESCRIPTION OF A PREFERRED EMBODIMENT

The following description will focus on the presently preferred embodiment of the present invention, which is implemented in a desktop application operating in an Internet-connected environment running under a desktop operating system, such as the Microsoft® Windows operating system running on an IBM-compatible PC. The present invention, however, is not limited to any one particular application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like. Therefore, the description of the exemplary embodiments that follows is for purposes of illustration and not limitation.

I. Computer-Based Implementation

A. Basic System Hardware (e.g., for Desktop and Server Computers)

Figure 1:
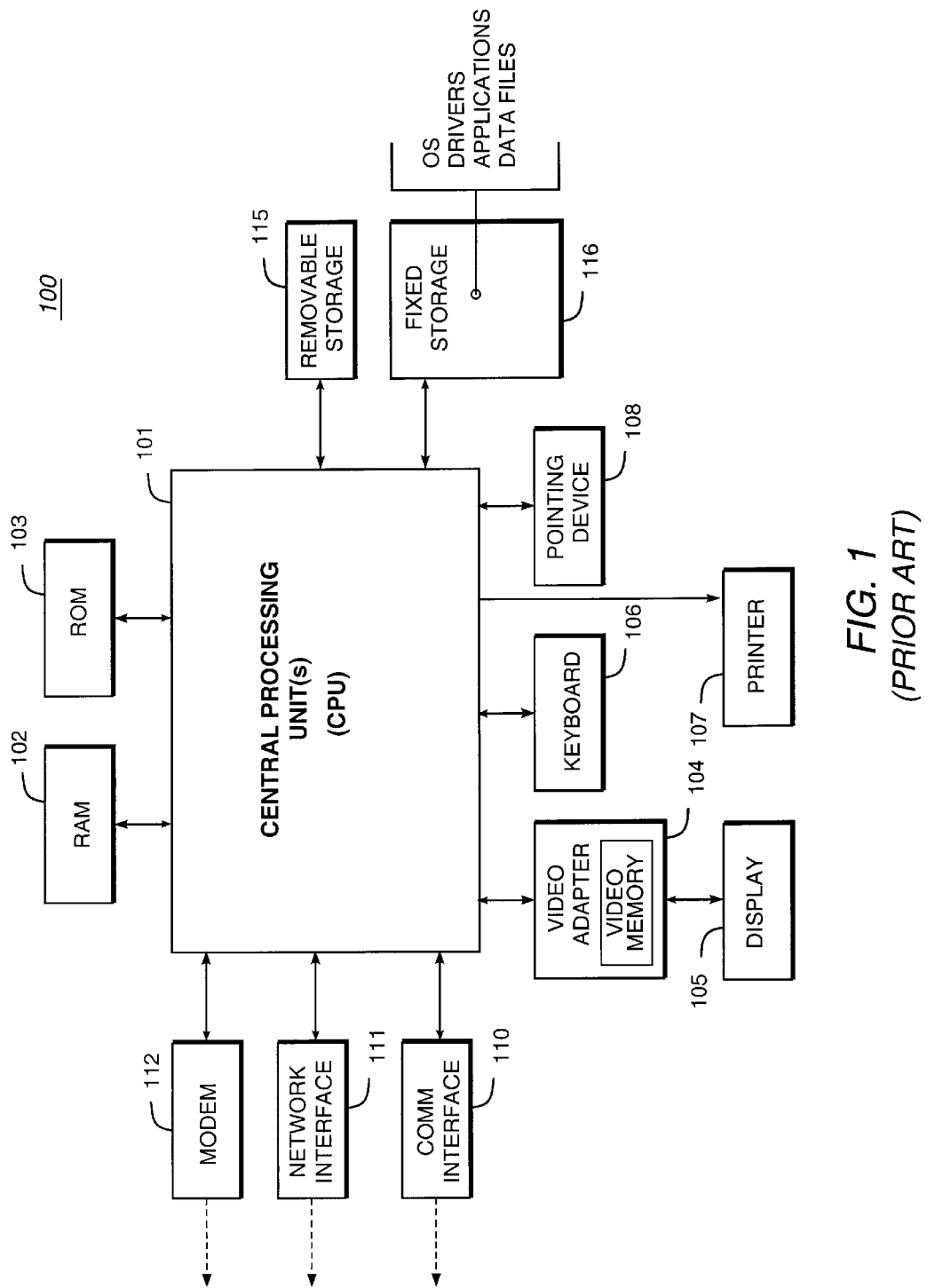
FIG. 1 is a block diagram of a computer system in which software-implemented processes of the present invention may be embodied.

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

B. Basic System Software

Figure 2:
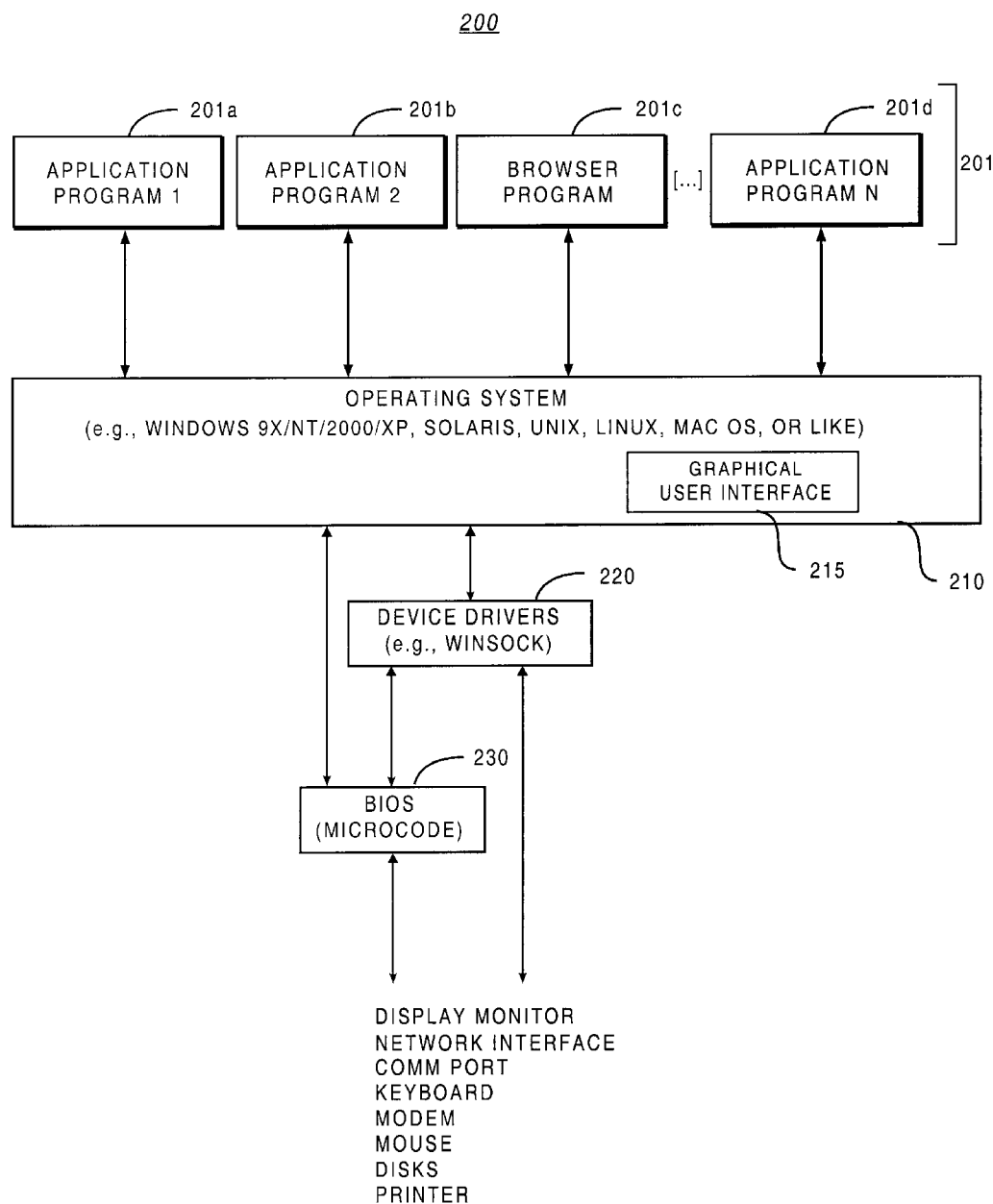
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100.

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft® Windows 9x, Microsoft® Windows NT, Microsoft® Windows 2000, or Microsoft® Windows XP, all available from Microsoft Corporation of Redmond, Wash. Alternatively, OS 210 can also be an alternative operating system, such as the previously-mentioned operating systems.

While the invention is described in some detail with specific reference to a single preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

C. Client/Server Database Management System

Figure 3:
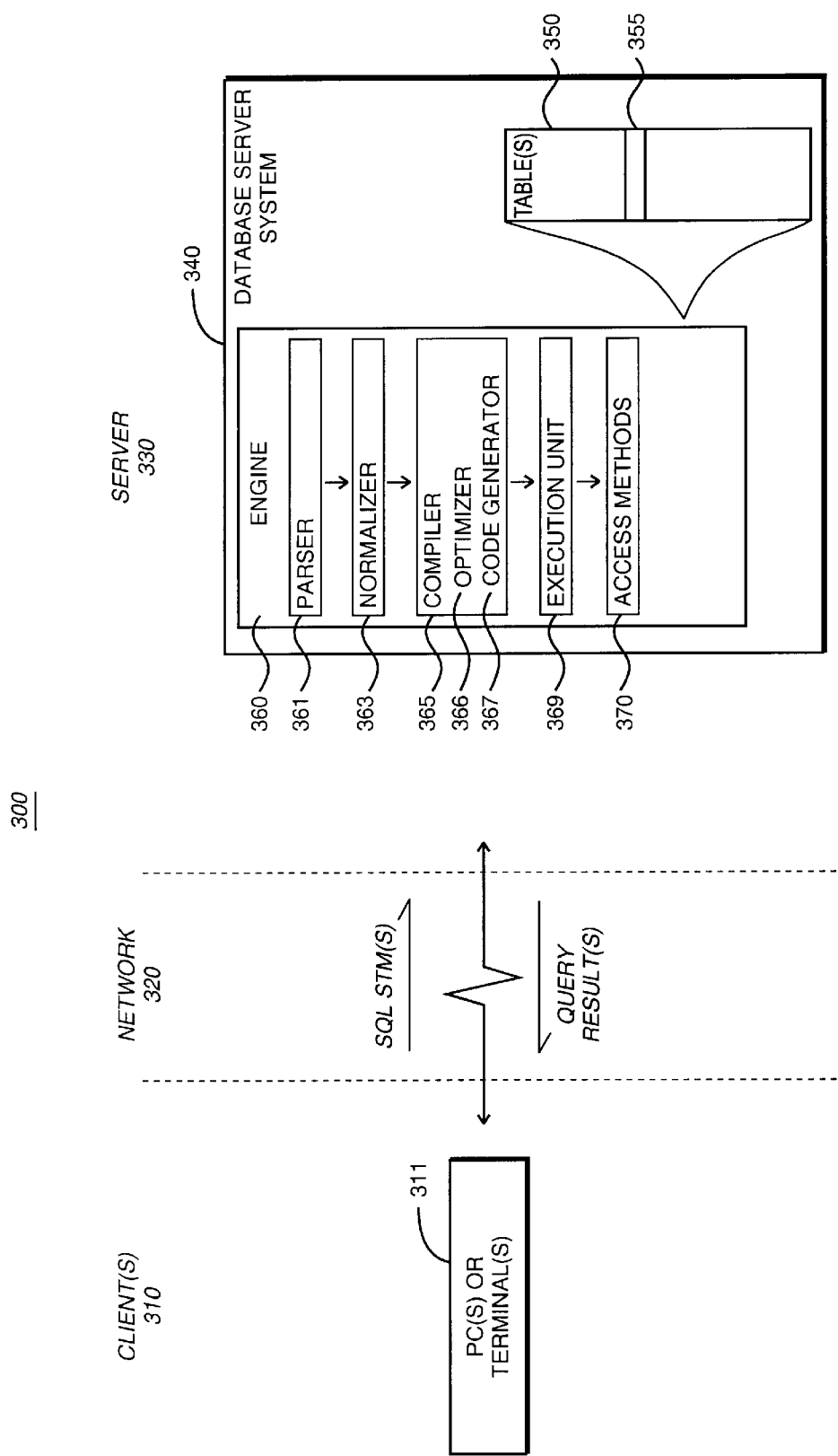
FIG. 3 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 3 illustrates the general structure of a client/server database system 300 suitable for implementing the present invention. As shown, the system 300 comprises one or more client(s) 310 connected to a server 330 via a network 320. Specifically, the client(s) 310 comprise one or more standalone terminals 311 connected to a database server system 340 using a conventional network. In an exemplary embodiment, the terminals 311 may themselves comprise a plurality of standalone workstations, dumb terminals, or the like, or comprise personal computers (PCs) such as the above-described system 100. Typically, such units would operate under a client operating system, such as Microsoft Windows client operating system (e.g., Microsoft Windows 95/98, Microsoft Windows 2000, or Microsoft Windows XP).

The database server system 340, which comprises Sybase® Adaptive Server® IQ (available from Sybase, Inc. of Emeryville, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.), or UNIX (Novell). The network 320 may be any one of a number of conventional network systems, including a Local Area Network (LAN) or Wide Area Network (WAN), as is known in the art (e.g., using Ethernet, IBM Token Ring, or the like). Network 320 includes functionality for packaging client calls in the well-known SQL (Structured Query Language) together with any parameter information into a format (of one or more packets) suitable for transmission across a cable or wire, for delivery to the database server system 340.

Client/server environments, database servers, and networks are well documented in the technical, trade, and patent literature. For a discussion of database servers and client/server environments generally and Sybase architecture particularly, see, e.g., Nath, A., *The Guide to SQL Server*, Second Edition, Addison-Wesley Publishing Company, 1995. For a description of Sybase® Adaptive Server® IQ, see, e.g., *Adaptive Server IQ 12.4.2 Product Documentation*, which includes the following: (1) *Adaptive Server Anywhere Programming Interfaces Guide*, (2) *Adaptive Server IQ Administration and Performance Guide*, (3) *Introduction to Adaptive Server IQ*, (4) *Adaptive Server IQ Multiplex User's Guide*, (5) *Adaptive Server IQ Reference Manual*, and (6) *Adaptive Server IQ Troubleshooting and Error Messages Guide*, all available from Sybase, Inc. of Dublin, Calif. (and currently available via the Internet at http://sybooks.sybase.com/iq.html). The disclosures of the foregoing are hereby incorporated by reference.

In operation, the client(s) 310 store data in, or retrieve data from, one or more database tables 350, as shown at FIG. 3. Typically resident on the server 330, each table itself comprises one or more rows or "records" (tuples) (e.g., row 355), each storing information arranged by columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the clients 310 issue one or more SQL commands to the server 330. SQL commands may specify, for instance, a query for retrieving particular data (i.e., data records meeting the query condition) from the database table(s) 350. The syntax of SQL (Structured Query Language) is well documented; see, e.g., the above-mentioned *An Introduction to Database Systems*. In addition to retrieving the data from Database Server tables, the Clients also include the ability to insert new rows of data records into the table; Clients can also modify and/or delete existing records in the table(s).

In operation, the SQL statements received from the client(s) 310 (via network 320) are processed by engine 360 of the database server system 340. Engine 360 itself comprises a parser 361, normalizer 363, compiler 365, execution unit 369, and access methods 370. Specifically, the SQL statements are passed to the parser 361 which converts the statements into a query tree—a binary tree data structure which represents the components of the query in a format selected for the convenience of the system. In this regard, the parser 361 employs conventional parsing methodology (e.g., recursive descent parsing).

The query tree is normalized by the normalizer 363. Normalization includes, for example, the elimination of redundant data. Additionally, the normalizer 363 performs error checking, such as confirming that table names and column names which appear in the query are valid (e.g., are available and belong together). Finally, the normalizer can also look up any referential integrity constraints which exist and add those to the query.

After normalization, the query tree is passed to the compiler 365, which includes an optimizer 366 and a code generator 367. The optimizer is responsible for optimizing the query tree. The optimizer performs a cost-based analysis for formulating a query execution plan. The optimizer will, for instance, select the join order of tables (e.g., when working with more than one table); it will select relevant indexes (e.g., when indexes are available). The optimizer, therefore, performs an analysis of the query and picks the best execution plan, which in turn results in particular ones of the access methods being invoked during query execution.

The code generator, on the other hand, converts the query tree into a set of instructions suitable for satisfying the query. These instructions are passed to the execution unit 369. Operating under the control of these instructions, the execution unit 369 generates calls into lower-level routines, such as the access methods 370, for retrieving relevant information (e.g., row 355) from the database table 350. After the plan has been executed by the execution unit, the server returns a query result or answer table back to the client(s).

The above-described computer hardware and software are presented for purposes of illustrating the basic underlying desktop and server computer components that may be employed for implementing the present invention. For purposes of discussion, the following description will present examples in which it will be assumed that there exists a "server" (e.g., database server) that communicates with one or more "clients" (e.g., personal computers). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

II. Database System Providing Optimization of Queries Joining Separate Tables

A. Overview

In a data warehousing environment, a database management system (DBMS) generally stores a very large quantity of information by breaking the information into several smaller segments and storing each of these segments in a separate database table. When these database tables are queried, the DBMS uses a SQL UnionAll operation to merge all the segments together before accessing the data to generate the query result. For example, a telephone transaction table containing customer phone call records may have information on over one billion phone calls over a one-year period. The traditional approach for storing a table containing this large quantity of information is to break the table into segments (such as by month or by quarter) and store each of these segments in a separate database table. At runtime, when a query asks for the total expenses incurred on long distance calls made in a particular region during the year, a UnionAll operator merges the data from all segments (e.g., separate quarterly tables), then groups the phone calls by region (using a SQL GroupBy operation) and calculates the total expenses by region. This approach of merging several segments by a UnionAll node is quite time consuming. Although the data contained in each of the segments may be scanned in concurrently, the UnionAll node handles each of the segments serially, resulting in a processing bottleneck that impacts system performance.

The improved method of the present invention pushes the GroupBy operation down into the input arms of the UnionAll node and consolidates data by groups, thereby significantly reducing the amount of data passed to the UnionAll node. This improved methodology removes the processing bottleneck of the UnionAll operation and produces better performance by maximizing the parallel processing of a query requesting data contained in multiple tables. Modification of the operations of a database engine for implementing this methodology will now be described.

B. Database System Including Improved Two Stage Query Optimization

Figure 4:
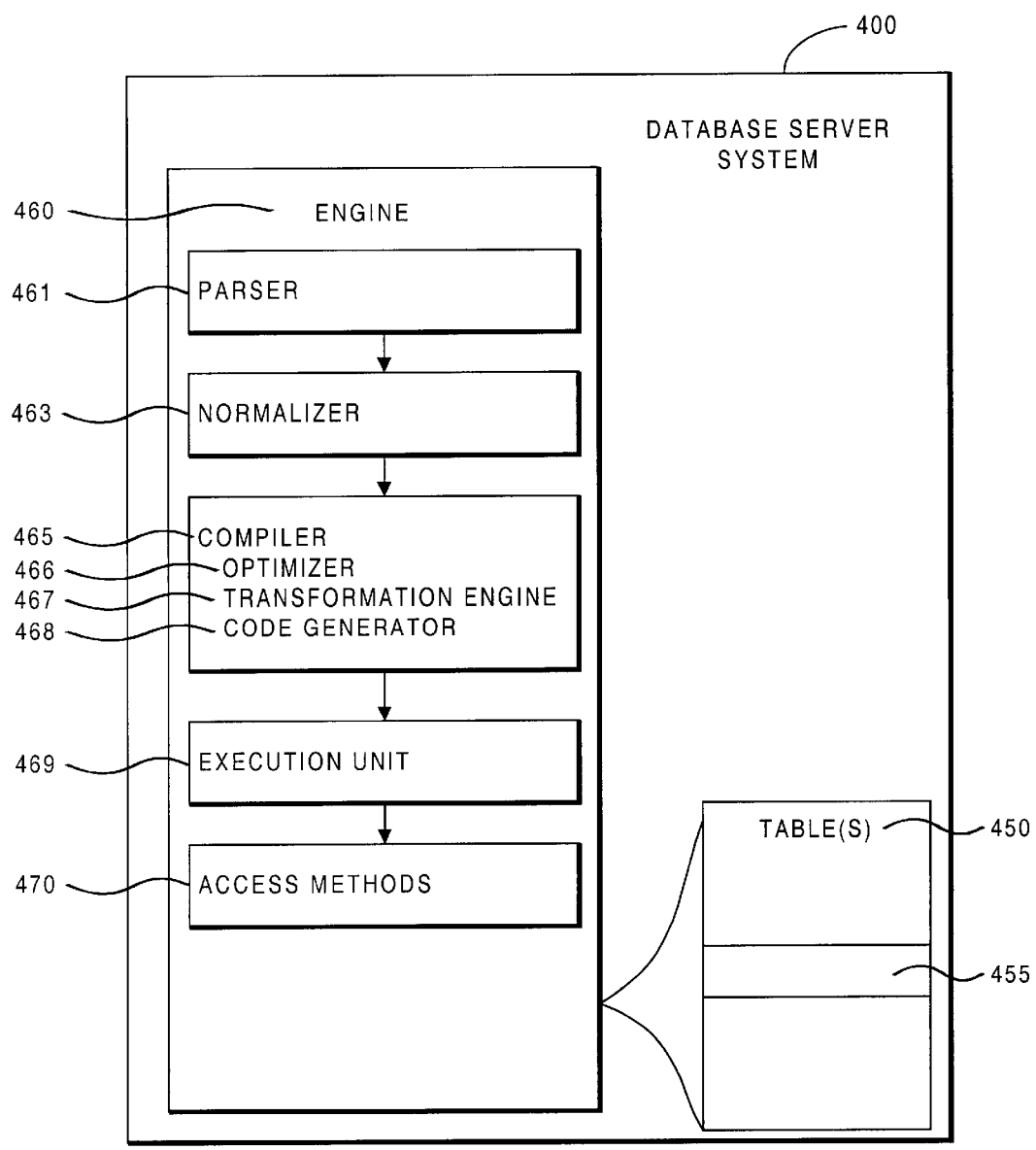
FIG. 4 illustrates a database server system modified for implementation of the present invention.

The present invention is preferably embodied in a client/server system database system as previously described. FIG. 4 illustrates the general structure of a database server system 400 modified for implementation of the present invention. Database server system 400, as shown at FIG. 4, is similar to database server system 340 previously illustrated at FIG. 3. However, certain modifications to the database engine have been made to implement the present invention as described below.

Database server system 400 includes an engine 460 and database table(s) 450. Engine 460 itself comprises a parser 461, normalizer 463, compiler 465, execution unit 469, and access methods 470. Complier 465 includes an optimizer 466, a transformation engine 467, and a code generator 468. The database server system 400, which comprises Sybase® Adaptive Server® IQ (available from Sybase, Inc. of Emeryville, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.) or UNIX (Novell). In the currently preferred embodiment, engine 460 employs a Volcano style query execution engine, which is also referred to as a "data flow engine." A Volcano query execution engine is based upon the notion of building small, self-contained modules in which each of these modules receives a standard input, takes one set of actions on this input, and generates a standard output. For further information on the Volcano model of plan execution, see e.g., Graefe, G. *Volcano—an Extensible and Parallel Query Evaluation System*, IEEE Transactions on Knowledge and Data Engineering (TKDE), volume 6(1), pp. 120–135, February 1994, the disclosure of which is hereby incorporated by reference. A Volcano execution engine has three commands, open ( ), next ( ), and close ( ). Open ( ) starts reading data from its input. Next ( ) does the specific operations of that particular module. Close ( ) indicates that there is no more input and the operation is concluding. These small self-contained modules (referred to as "nodes") can then be connected together to perform more complicated functions. For example, a first node may perform a sorting function, while another node will join two things together. A third node may be used to summarize results and a fourth node to create a distinct set. At runtime, an optimizer joins these nodes together into trees. The result will be a tree with small modules built together to accomplish certain tasks. For example a tree might first scan using module 1, then filter using module 2, then join using module 3, and so forth. This approach makes development more rapid, and also makes testing more effective and thorough than with other methods. These small self-contained modules can be thoroughly tested with both black box and white box testing, because the modules are small and perform only a limited set of operations. Another advantage is that optimizers are more flexible and can be adapted more quickly. The functions performed by each module of engine 460 in executing a query will now be described.

When an SQL query is received by engine 460, the query is passed to parser 461 which converts the statements into a query tree—a binary tree data structure which represents the components of the query in a format selected for the convenience of the system. The query tree is next normalized by the normalizer 463 in the manner previously described. After normalization, the query tree is passed to the compiler 465, which includes an optimizer 466, a transformation engine 467 and a code generator 468. Of particular interest to the present invention is transformation engine 467. Transformation engine 467 is a module added after the optimizer to transform the query tree generated by the optimizer to implement the methodology of the present invention. Accordingly, the presently preferred embodiment includes two distinct optimization phases. In the first phase, which is referred to as "plan-to-plan" optimization, a query tree is created by optimizer 466. In the second phase, transformation engine 467 takes the query tree generated by optimizer 466 and transforms the query tree in the manner described below to better optimize the execution of the query.

After optimization and transformation of the query, code generator 468 converts the query tree into a set of instructions suitable for satisfying the query. These instructions are passed to the execution unit 469. Operating under the control of these instructions, the execution unit 469 generates calls into lower-level routines, such as the access methods 470, for retrieving relevant information (e.g., row 455) from the database table 450. After the plan has been executed by the execution unit, the server returns a query result or answer table back to the client(s). The operations of the improved engine of the present invention in the execution of a database query will now be described and compared to the approach of prior art systems.

C. Example of Query Execution Using Improved Methodology

The operation of the improved methodology of the present invention is probably best illustrated by example. The following discussion uses two examples to illustrate the improved methodology of the present invention compared to prior art systems. This discussion first briefly summarizes the approach of query execution plans of prior art systems. The improved query execution methodology of the present invention is then illustrated using the same types of sample queries.

Figure 5A:
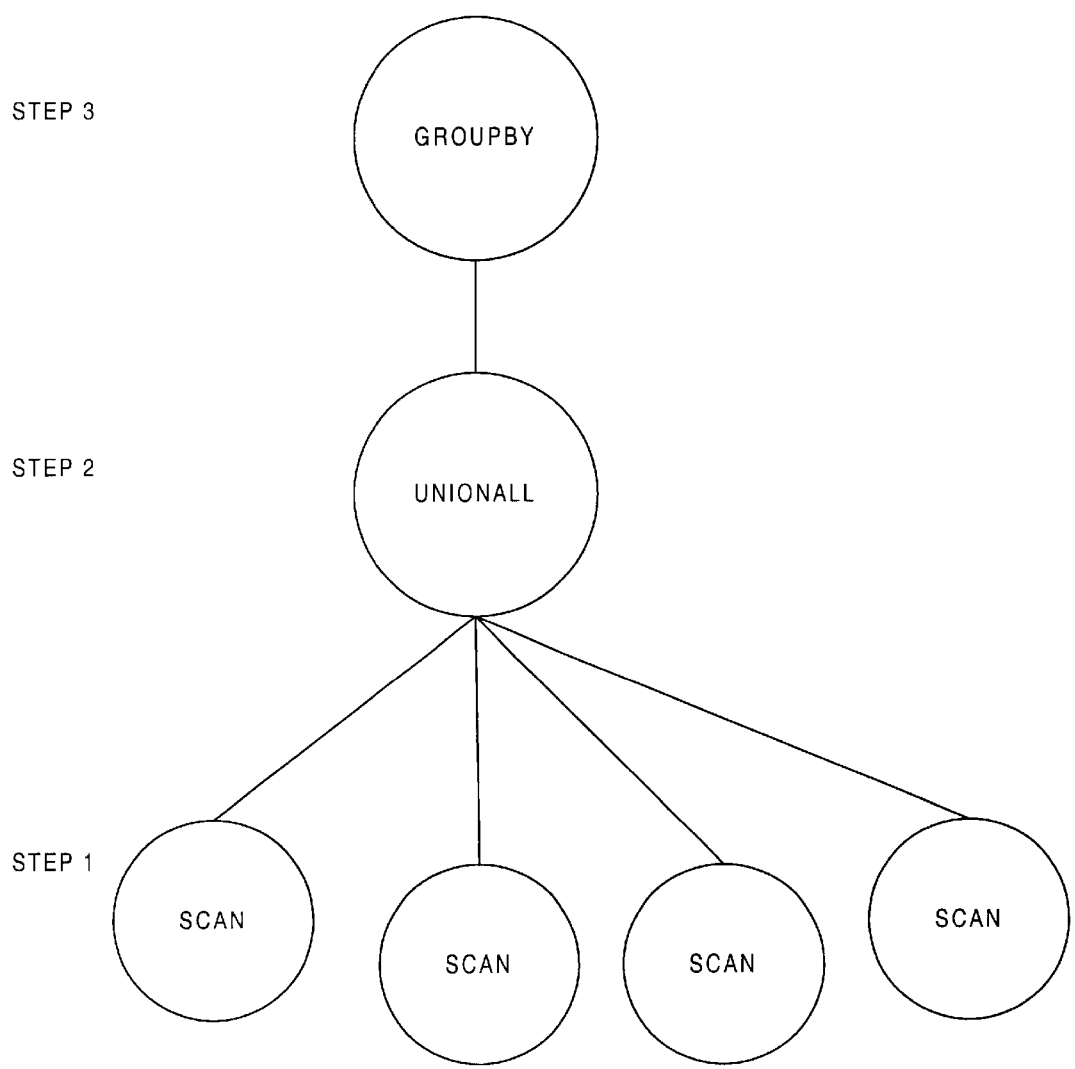
FIG. 5A is an illustration of a traditional query execution plan for joining separate database tables.

One of the primary uses of a data warehouse or database system is to make historical business information available for analysis. For example, a user may wish to obtain summary sales information (e.g., a monthly sales report) for a particular month from a database system in which monthly sales information is segmented into four database tables, with each of these tables containing sales information for a one-week period. In order to build a monthly sales report from four one-week sales tables in a prior art system, one first starts with a node that scans each separate physical table (i.e., the four one-week tables) and then unions these several physical tables together to create a higher-level object (e.g., union of four weeks to create one month). An illustration of a traditional query execution plan for joining four separate database tables is set forth at FIG. 5A. As shown at FIG. 5A, this traditional execution plan includes four scans of weekly tables and a UnionAll node that serially drains each of the four arms in turn (i.e., each of the four one-week sales tables). If the user has requested a sorted summary of certain information for the month (e.g., a summary of the month's sales sorted by salesperson), another serial operation is required to go through the data row by row and build up the summary. As shown at FIG. 5A, this summarization operation is implemented by a GroupBy node over the UnionAll node. This GroupBy node takes one row at a time from the UnionAll node and processes this data in a serial fashion until it reaches the last row of the fourth table. At this point the GroupBy node is in a position to return the requested summary data containing monthly sales information sorted by salesperson.

A second example involving larger amounts of data is illustrated by the previously described example of a telephone transaction table containing more than one billion telephone calls over a one year period. Using the traditional query execution plan approach of prior art systems, a query asking for the total expenses incurred on long distance calls made in a particular region during a calendar year is converted into a SQL expression like the following:

CREATE VIEW vtable (v_pnum int, v_region char(4), v_expenses double) AS
SELECT p_num, p_region, p_expenses FROM Table_Q1
UNION ALL
SELECT p_num, p_region, p_expenses FROM Table_Q2
UNION ALL
SELECT p_num, p_region, p_expenses FROM Table_Q3
UNION ALL
SELECT p_num, p_region, p_expenses FROM Table_Q4;
SELECT v_region, SUM(v_expenses), COUNT(v_pnum) FROM vtable GROUP BY v_region;

To execute this traditional query execution plan the database engine performs the three steps illustrated at FIG. 5A. In step 1, each of the scan nodes reads in columns from the different segments concurrently. If the yearly telephone information is segmented into four separate quarterly database tables, this involves four scan operations on the quarterly tables comprising the year. Next, in step 2, the UnionAll node drains the data sequentially starting with the first scan node and ending with the fourth scan node. If each segment table contains two hundred million records, this step requires the UnionAll node to merge a total of eight hundred million records. In step 3, the GroupBy node receives the eight hundred million records from the UnionAll node (step 2), combines these records into groups (e.g., telephone transactions by region), and then sums up the results (e.g., expenses) for each region. If the telephone transaction table includes 15 different regions, the GroupBy operator must produce 15 summation results.

As illustrated by these examples, the traditional query execution plan involves serial operations that may cause a processing bottleneck in data warehousing environments handling large volumes of data. In addition, the traditional approach does not fully utilize the machine power of parallel processing machines typically used in these environments. Although the data can be scanned in parallel in the first step of the traditional method, the scanned data has to wait in the input arms of the UnionAll node in order to merge into the output buffer of the UnionAll node. The fact that the grouping and aggregation operation is running sequentially, rather than in parallel, not only delays the return of query results, but also fails to utilize the capabilities of available parallel processing machines.

Figure 5B:
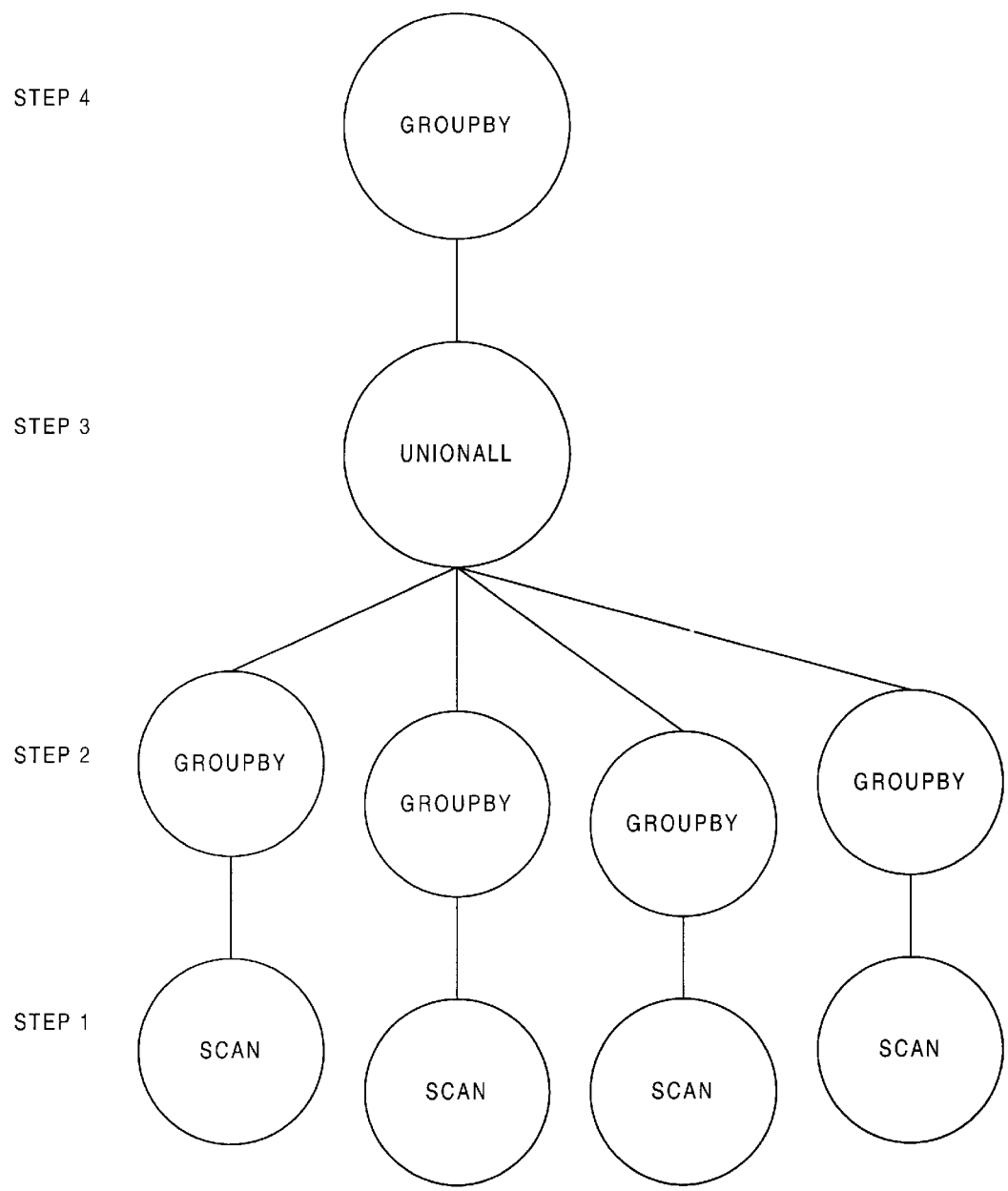
FIG. 5B illustrates the improved method of the present invention for optimization and execution of a query including a GroupBy operator over a UnionAll node.

FIG. 5B illustrates the improved method of the present invention for optimization and execution of a query including a GroupBy operator over a UnionAll node. The improved method of the present invention enhances the execution of the query by splitting the GroupBy operation into each input arm of the UnionAll node, as shown at FIG. 5B. In other words, the GroupBy operation is pushed down into each child of the UnionAll node, so that each physical table is summarized in parallel. Execution of the enhanced query plan involves four high-level steps, as shown at FIG. 5B. Step 1 is similar to the previously-described traditional method, in which each scan node concurrently reads in data from separate database tables. In this example, four scan nodes are used to scan data from four separate database tables. However, the improved methodology of the present invention includes, at step 2, a child GroupBy node for each of the scan nodes. As shown at FIG. 5B, each of the four child GroupBy nodes receives data (e.g. two hundred million telephone transaction records) from its linked scan node independently. Each of these child GroupBy nodes concurrently groups data and generates summary results in parallel, taking advantage of available parallel processing hardware. For example, using a multiple CPU machine, one CPU can summarize table 1, a second CPU can at the same time summarize table 2, a third CPU can summarize table 3, and so forth. The improved methodology of pushing down the GroupBy nodes into each arm of the UnionAll operator enables the grouping and aggregation operation to be performed in parallel on each segment of the data.

When each arm (i.e., each child GroupBy node) has generated summary results, in step 3 the UnionAll node merges the aggregated results from the child GroupBy operators and passes them to the parent GroupBy node of step 4. As shown at FIG. 5B, the master or parent GroupBy node of step 4 combines the partial aggregated results to produce a final aggregation result. This improved method combines data from each segment in step 2 concurrently, thereby reducing the amount of data processed by the UnionAll node of step 3 and the GroupBy node of Step 4. Using the above example, the UnionAll node only needs to merge 15 rows of the aggregated results for the regions from four input buffers and the GroupBy node in step 4 only needs to sum four rows of data per group. Compared with the traditional method, this new approach maximizes the parallel processing of the query, thereby removing the performance bottleneck. The detailed method steps of the new approach will now be described in greater detail.

D. Detailed Method Steps for Improved Query Execution

Figure 6A:
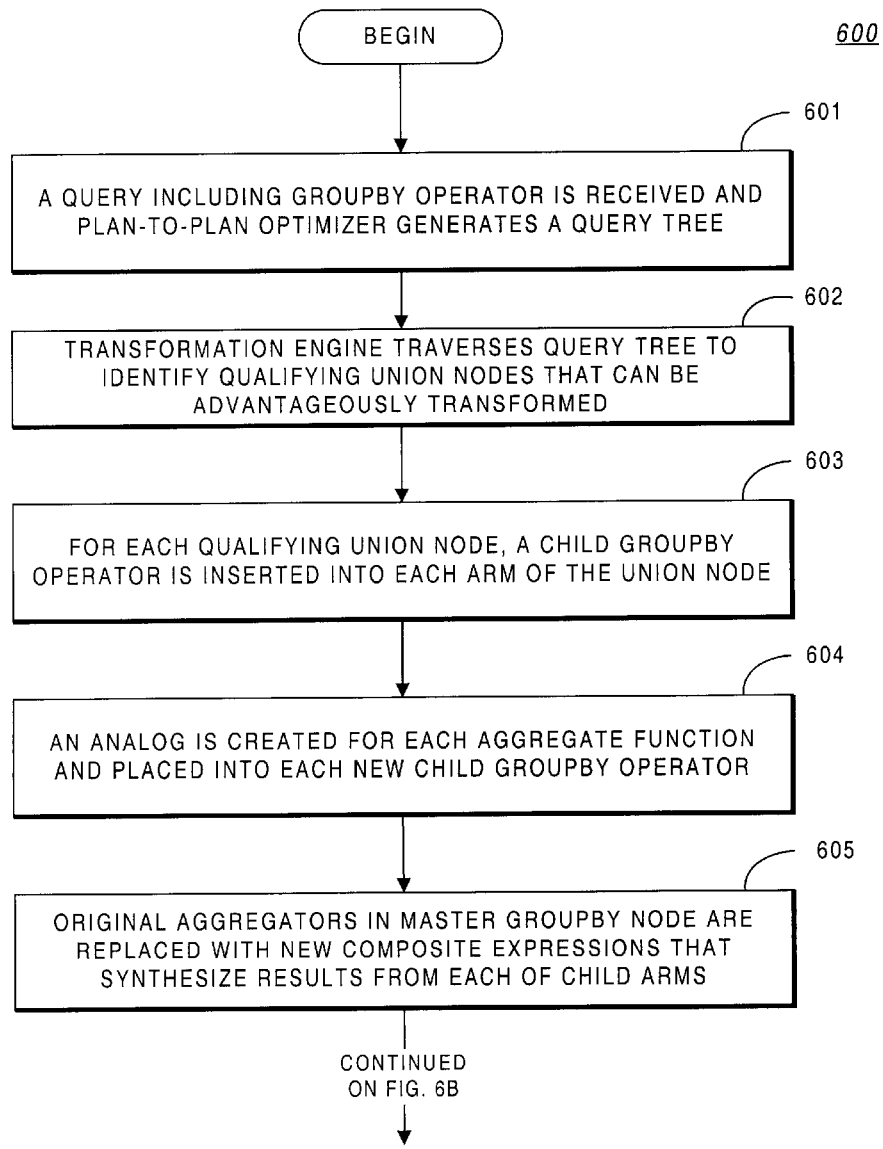
FIGS. 6A–B comprise a single flowchart describing the detailed method steps of the operation of the present invention in executing a query for information in multiple separate database tables.
Figure 6B:
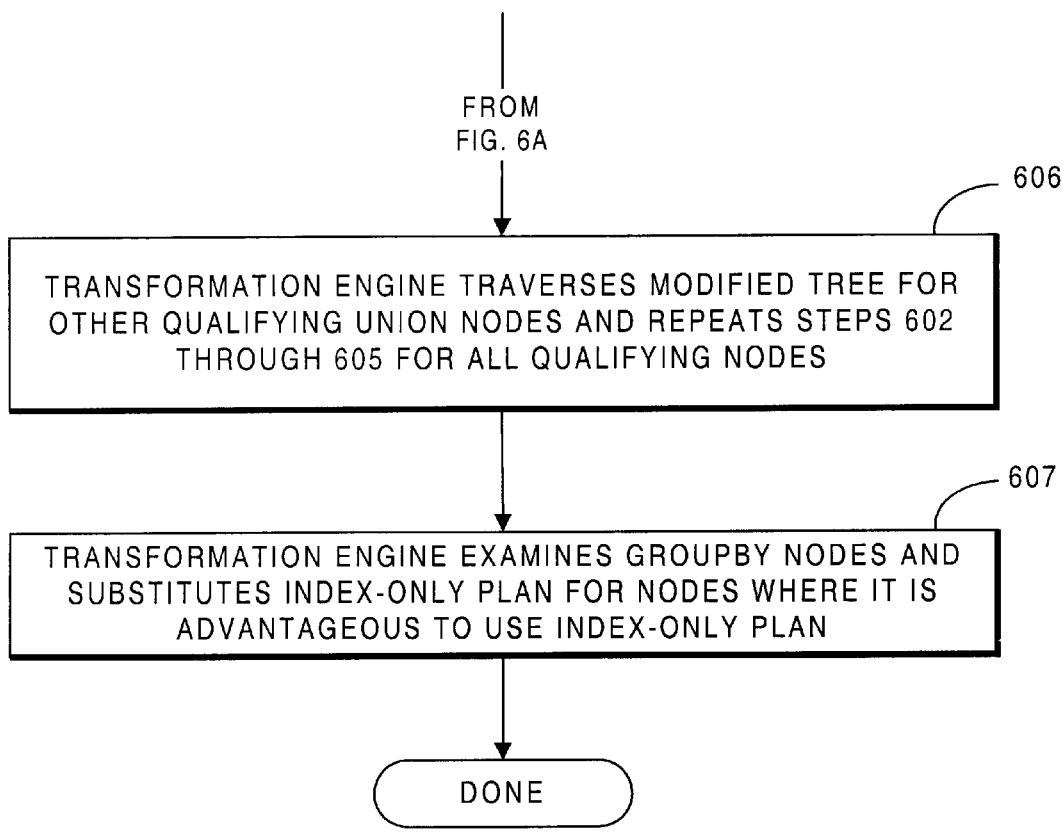

FIGS. 6A–B comprise a single flowchart describing the detailed method steps of the operation of the present invention in executing a query seeking information maintained in multiple separate physical tables. The operation of the present invention is illustrated using an example of monthly sales information that has been segmented into four one-week segments. Each of these four one-week segments has been stored as a physically separate database table. The operation begins when a query is received that requests information to be drawn from these separate tables and summarized using a SQL GroupBy operator.

As shown at FIGS. 6A–B, a query is received that includes a GroupBy and requests information to be drawn from physically separate database tables. At step 601, the query is parsed and the plan-to-plan optimizer generates a parse or query tree. At step 602, the transformation engine proceeds with a top down traversal of the parse tree. The transformation engine starts from the root node of the tree produced by the plan-to-plan optimizer and proceeds down the tree looking for union nodes. When the transformation engine encounters a union node, it determines if that particular node qualifies for transformation. In other words, the transformation engine determines whether or not each particular UnionAll node encountered is one that can be advantageously transformed utilizing the methodology of the present invention. As described below, there are certain restrictions (or disqualifying conditions) that may preclude use of the method for particular segments of a query tree.

This determination is made separately for each union node by applying the criteria set forth below and the transformation process is performed segment by segment. Some portions of the query tree may be transformed, while other segments that cannot be advantageously transformed are not converted.

Two sets of criteria are applied to determine whether or not to transform a particular union (UnionAll) node. First, a determination is made as to whether or not the union node qualifies (i.e., meets the conditions) for applying the method. Only certain queries or query segments are eligible for transformation. In order to qualify, the query or segment must include a GroupBy operator immediately over a UnionAll node. Also, the union node itself that is being examined cannot be distinct. In other words, the union node that is the root node of a particular segment cannot be distinct unless it is possible to eliminate the distinct operator based on functional dependency analysis. Another disqualifying condition is if the aggregation function in the query contains a Distinct operation.

If examination of a segment indicates that a particular union node qualifies for transformation, a second set of criteria or metrics are applied to determine whether or not transformation will actually result in an improved query execution plan (i.e., performance will be improved by transformation). This analysis includes determining if the system has available resources that can be used to process in parallel the new child GroupBy operators that are to be inserted into the query tree. If temporary shared cache is low on memory, and if these resources cannot be temporarily increased, then new GroupBy nodes cannot be inserted as there is not sufficient memory space available to process each arm of the UnionAll node in parallel. A second metric that is examined is the availability of adequate processing resources. A determination is made as to whether or not there are available CPU processing resources to process tables concurrently. In addition, in the currently preferred embodiment, the GroupBy expression itself is also analyzed to determine if the grouping expressions listed in the GroupBy columns are individual columns. The optimizer of the currently preferred embodiment only allows the expression in the aggregation argument to contain one view column. Thus, in the currently preferred embodiment, the method of the present invention may not be applied to a query such as the following:
CREATE VIEW viewA (v1 int, v2 int, v3 int, v4 int) AS
SELECT b1, b2, b3, b4 FROM tableB
UNION ALL
SELECT c1, c2, c3, c4 FROM tableC;
SELECT SUM (v1*v2) FROM viewA GROUP BY v3;
However the present invention may be applied to a query such as the following, which has only one view column in the aggregation expression:
CREATE VIEW viewA (v1 int, v2 int, v3 int, v4 int) AS
SELECT b1, b2, b3, b4 FROM tableB
UNION ALL
SELECT c1, c2, c3, c4 FROM tableC;
SELECT SUM(v1*10) FROM viewA GROUP BY v2, v3;

If step 602 determines that a particular query segment or node is eligible for transformation and that is advantageous to proceed with transformation, the method proceeds to step 603 in which qualifying nodes are transformed. For each child (or arm) of a qualifying union node, a child GroupBy node is created and inserted into the operator tree between the union node and what was previously the immediate child of the union node. The purpose of each child GroupBy node is to aggregate the results from one arm of the union node.

Once the new child GroupBy nodes have been created and inserted in the operator tree, at step 604 an analog is created for each aggregate function that was in the master GroupBy (i.e., the original GroupBy above the union node). These analogs are placed into each of the new child GroupBy operators. For example, if "February.x" was in the original master GroupBy, analogs in the child GroupBy operators handling the four weeks of February will perform a sum on "t.x" within each week of February (e.g., each of weeks one, two, three, four). In other words, a sum on February becomes instead a sum on each of the 4 individual weeks making up February (using the present example in which February was segmented into 4 weekly tables).

After analogs are created for each aggregate operator in the original (master) GroupBy and inserted into each of the child arms, at step 605 the original aggregators in the master GroupBy are removed and are replaced with new composite expressions that collect the results from each of the child arms and synthesize them in an appropriate manner. For example, the counts for each of the four weeks of February are collected and synthesized into a total for the month (sum of the counts). This involves replacing the original aggregate operator with a synthesized operator that performs correct operations in combination with the analogs present in the children arms of the union node. The aggregate functions of the original (master) GroupBy node may be modified so that the master node will properly accept results that are already pre-grouped by a sub-aggregator (the analogs) rather than accepting raw input. For example, instead of counting all sales made by a particular salesperson, an aggregate function in the master node may be revised to sum together the subtotals of what all sales were made by this particular salesperson in weeks 1, 2, 3, and 4 as reported by the sub-aggregators. Data type issues may also need to be addressed in connection with bringing all of the results together in the master GroupBy node. For example, if a certain data type is used to hold the sum of two hundred million rows in one arm, the correct data type must be used to handle the higher-level sum from multiple arms. Replacement of the aggregate operators in the master GroupBy node also includes synthesis of data types resulting from the union of each of the child arms of the union node. At the end of this step 605, the qualifying segment or node of the original operator tree has been transformed into a slightly different operator tree having more nodes, but returning the same results as the original operator tree. The result is an optimized segment of the operator tree with additional child GroupBy nodes inserted under the union node enabling portions of the query to be processed in parallel.

At step 606, the method continues by searching for additional candidate locations to apply the above transformation. The transformation engine traverses the modified query tree for other qualifying nodes that can be advantageously transformed. If qualifying nodes are identified, the transformation engine applies steps 602 through 605 for each qualifying node until all qualifying segments have been identified and transformed.

A final step 607 reviews whether or not an index-only query execution plan may be available for any segments of the modified operator tree. As previously described, index-only plans would not have been possible prior to transformation because no index spanned all of the data. As a further optimization provided by the present invention, a subsequent stage of the transformation engine determines if an index-only plan can be used for particular query segments to more efficiently execute the query. The transformation engine examines each of the GroupBy nodes of the modified query tree to determine if one or more of the GroupBy nodes can be converted into index-only plans on individual arms. This involves searching for GroupBy nodes over a leaf node and examining each such individual node that is discovered. The examination evaluates whether an index-only plan can be substituted in a particular node and, if so, whether or not it is advantageous (i.e., more efficient) to do so. If it is determined to be advantageous to substitute an index-only plan, then a special kind of a leaf node is created to handle the actual aggregation and grouping inside the leaf node in the index. An index-only plan is only substituted in instances where an index-only plan is valid and provides greater efficiency.

The ultimate output from the above steps is a modified operator tree that can be executed to more efficiently return query results. The modified operator tree creates additional parallelism, reducing the processing bottleneck commonly found in traditional query execution plans. In addition to creating parallelism, query optimization is also improved as the optimizer can individually create an optimal plan for summarization of each separate table. For example, a plan may involve hash-based summarizing on one arm and sort-based summarizing on another arm, depending on the query and the size of the tables, involved. The method of the present invention improves query execution by breaking serial operations into a group of child operations that can be individually optimized and processed in parallel.

Appended hereto is a Computer Program Listing Appendix containing source listings providing further description of the present invention. In particular, the source code listings demonstrate the selection of qualifying nodes that are suitable for transformation as well as the methodology for transformation of qualifying nodes for improved query optimization.

While the invention is described in some detail with specific reference to a single preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

COMPUTER PROGRAM LISTING APPENDIX

```
/   *   Restrictions for spilt Group By node Across UnionAll
    *   1.  If GroupByUnordered is used as Union distinct
    *       (NAggs == 0) do not split.
    *   2.  Aggregation with Distinct is not be split.
    *   3.  If resource is not big enough.
    *   4.  If Group By column or Aggregation Argument contains
    *       more than one virtual column (or Switch)
    *   5.  GroupBy Ordered is not split across UnionAll in first release.
    *   /
hos_boolean dfo_GroupBy::CanBeSplitAcrossUnion( )
{
    dfo *childDfo = GetChild(0);
    hos_int k=0;
    if ((IsKindOf(CLASS_dfo_GroupBySingle) ||
            IsKindOf(CLASS_dfo_GroupByUnordered)) &&
        childDfo->IsKindOf(CLASS_dfo_UnionAll))
    {
        // cannot split a parallel-GBH created UNION
        dfo_UnionAll *uniondfo = static_cast(dfo_UnionAll *, childDfo);
        if (uniondfo->IsArtificialUnion( ))
            return HOS_FALSE;
        hos_uint NAggs= GetNAggs( );
        hos_uint NGbKeys = GetNGroupByColumns( );
        hos_uint NonGbKeys = GetNNonGroupedColumns( );
        // calculate resource only for hash group by
        if (IsKindOf(CLASS_dfo_GroupByUnordered))
        {
            // union distinct is not support for first release
            if (NAggs == 0)
                return HOS_FALSE;
            dfo_GroupByUnordered *gb=static_cast(dfo_GroupByUnordered *, this);
            if (gb->GetCardinality( ) * (childDfo->GetNChildren( )) > gb-
>GetMaxHashRows( ))
                return HOS_FALSE;
        }
        for ( k=0; k< NonGbKeys; k++)
        {
            dfe *arg= GetNonGroupedColumn(k);
            dfe *switchDfe =0;
            if (arg->CountUniqueSwitchReferences ( ) !=1)
                return HOS_FALSE;
```

-continued

COMPUTER PROGRAM LISTING APPENDIX

```
                    else
                        switchDfe= arg->FindUniqueSwitch( );
                    if (!switchDfe)
                        return HOS_FALSE;
        }
        for ( k=0; k< NGbKeys; k++)
        {
            dfe *arg= GetGroupByColumn(k);
            dfe *switchDfe =0;
            hos_uint a = arg->CountUniqueSwitchReferences ( );
            if (arg->CountUniqueSwitchReferences( ) != 1)
                return HOS_FALSE;
            else
                switchDfe= arg->FindUniqueSwitch( );
            if (!switchDfe)
                return HOS_FALSE;
        }
        for (k=0; k < NAggs; k++)
        {
            dfe_SetFunction *sfdfe = static_cast(dfe_SetFunction *,
                                        GetAggVector( ) ->GetObjectAtIndex(k));
        if (sfdfe->GetIsDistinct( ))
            return HOS_FALSE;
            // check args of aggregation only support dfe_column for now
            if (sfdfe->GetNArgs ( )>0)
            {
                dfe *sfarg = sfdfe->GetDFEArg(0);
                dfe *swDfe=0;
                // if arg contain group by columns return false
                for ( hos_uint x=0; x< NGbKeys; x++)
                {
                    dfe *colarg= GetGroupByColumn(x);
                    if (sfarg->GetDependencyVector( )->Contains (colarg, HOS_TRUE))
                        {
                            return HOS_FALSE;
                        }
                    }
                    if (sfarg->CountUniqueSwitchReferences ( )> 1)
                    return HOS_FALSE;
                        else
                    swDfe= sfarg->FindUniqueSwitch( );
                        if (!swDfe)
                    return HOS_FALSE;
                    // this one may not need
                    if ((swDfe->GetDFEArg(0))->CountUniqueColumnReferences( )>1)
                        return HOS_FALSE;
                }
            }
            return HOS_TRUE;
        }
    return HOS_FALSE;
}
    hos_boolean
    opt_Driver::SplitGroupByAcrossUnion(dfo *a_dfo, df_Heap *heap, dfo *root)
    {
        dfo *child, *grandChild;
        for (hos_uint i=0; i<a_dfo->GetNChildren( ); i++)
            {
                hos_uint j,x,z;
                child = a_dfo->GetChild(i);
                if (child->IsKindOf(CLASS_dfo_GroupBy))
                    {
                        dfo_GroupBy *gb = static_cast(dfo_GroupBy *, child);
                        // if group by can be split
                        if ( gb->CanBeSplitAcrossUnion( ) &&
                            gb->AllGroupingExprsAreVirtualSwitches( ) ||
                        DMLOPTIONS3_MASTER_BIT(
                                    PARAMID_DMLOPTIONS3_YES_SPLITGB_GB_EXPR)))
                            {
                            hos_boolean countStar = HOS_FALSE;
                            hos_boolean insertUnderStore = HOS_FALSE;
                            grandChild = gb->GetChild(0);
                            dfo_UnionAll *UnionNode = static_cast(dfo_UnionAll
```

COMPUTER PROGRAM LISTING APPENDIX

```
*,grandChild);
                            // insert new group by under dfo_store
                            for (z=0; z< UnionNode->GetNChildren( ); z++)
                            {
                                if ((UnionNode->GetChild(z))->IsKindOf(CLASS_dfo_Store))
                                {
                                    dfo *childOfStore = (UnionNode->GetChild(z))->
GetChild(0);
                                    if (childOfStore->IsKindOf(CLASS_dfo_GroupBy))
                                    return HOS_FALSE;
                                    insertUnderStore = HOS_TRUE;
                                }
                            }
                            hos_uint NAggs= gb->GetAggVector( )->Entries( );
                            hos_uint NGbKeys = gb->GetGroupVector( )->Entries( );
                            hos_uint NNonKeys = gb->GetNonGroupVector( )->Entries( );
                            hos_uint totalCols = NAggs+NGbKeys+NNonKeys;
                            hos_vector newGBVec(NGbKeys);
                            hos_vector newNonGBVec(NNonKeys);
                            hos_vector newAggVec(NAggs);
                            hos_vector newAggSwitches(NAggs);
                            hos_vector newGBColSwitches(totalCols);
                            hos_vector OldUnionSwitches(totalCols);
                            // sort the count(*) to the end of aggregate vector
                            // so that new switches can be aligned with the old one.
                            // for later replacement
                            hos_vector replacementVector;
                            hos_vector CountAggVector(NAggs);
                            for (j = 0; j < NAggs; j++)
                            {
                                dfe_SetFunction *aggDFE = static_cast(dfe_SetFunction *,
                                        gb->GetAggVector( ) ->GetObjectAtIndex (j));
                                if (aggDFE->IsKindOf(CLASS_dfe_CountAggregate) &&
                                    aggDFE->GetIsCountStar( ))
                                CountAggVector.Add (aggDFE);
                                    else
                                replacementVector.Add(aggDFE);
                            }
                            for (j=0; j< CountAggVector.Entries( ); j++)
                            {
                                countStar = HOS_TRUE;
                                replacementVector.Add(CountAggVector.GetObjectAtIndex(j));
                            }
                            // copy the new ordered vector back to groupby node.
                            if (countStar)
                            {
                                gb->GetAggVector( )->Clear( );
                            for (j=0; j< replacementVector.Entries( ); j++)
                                gb->GetAggVector( ) -
>Add (replacementVector.GetObjectAtIndex(j));
                                DF_ASSERT(NAggs == gb->GetAggVector( )->Entries( ));
                            }
                            replacementVector.Clear( );
                            CountAggVector.Clear( );
                            for (j = 0; j < NAggs; j++)
                            {
                                dfe_Switch *switchDFE = HOS_NEWPERM("SplitGroupby",
                                            dfe_Switch, ( ));
                                newAggSwitches.Add(switchDFE);
                            }
                            for (j = 0; j < NGbKeys+NNonKeys; j++)
                            {
                                dfe_Switch *switchDFE = HOS_NEWPERM("SplitGroupby",
                                            dfe_Switch, ( ))
                                newGBColSwitches.Add(switchDFE);
                            }
                            for (j=0; j< UnionNode->GetNChildren( ); j++)
                            {
                                hos_uint k=0;
                                dfo *UnionArm = 0;
                                dfo *parentOfNewGb =0;
                                    if (insertUnderStore)
```

COMPUTER PROGRAM LISTING APPENDIX

```
            {
                if (UnionNode->GetChild(j)->IsKindOf(CLASS_dfo_Store))
                {
                    UnionArm = UnionNode->GetChild(j) ->GetChild(0);
                    parentOfNewGb =UnionNode->GetChild(j);
                }
                else
                {
                    UnionArm = UnionNode->GetChild(j);
                    parentOfNewGb = UnionNode;
                }
            }
        else
            {
                UnionArm = UnionNode->GetChild(j);
                parentOfNewGb = UnionNode;
            }
                const hos_vector_noerror *outputVector =
                        UnionArm->GetOutputVector( );
                newGBVec.Clear( );
                newNonGBVec.Clear( );
                newAggVec.Clear( );
                for ( k=0; k< NGbKeys; k++)
            {
                dfe *arg = static_cast(dfe *,
                        gb->GetGroupVector( )->GetObjectAtIndex(k));
                dfe_Switch *newSwitch =static_cast(dfe_Switch *,
                        newGBColSwitches.GetObjectAtIndex(k));
                // arg can be a virtual column or a switch
                dfe *oldsw = arg->FindUniqueSwitch( );
                    if (j==0)
                oldUnionSwitches.Add(oldsw);
                dfe *outarg= FindDFE(j, arg, outputVector, heap);
                if ( outarg)
                    {
                    newGBVec.Add(outarg);
                    newSwitch->AddArg(outarg);
                }
                else
                    {
                newGBColSwitches.Clear( );
                newAggSwitches.Clear( );
                return HOS_FALSE; // could not find arg
                }
            }
        }
// the top nonGbKey selectDFE looks like a switch(x,y)
        for ( k=0; k< NNonKeys; k++)
        {
            dfe *arg = static_cast(dfe *,
                gb->GetNonGroupVector( ) ->GetObjectAtIndex(k));
            dfe_Switch *newSwitch =static_cast(dfe_Switch *,
                newGBColSwitches.GetObjectAtIndex(k+NGbKeys));
            dfe *oldsw = arg->FindUniqueSwitch( );
                if (j==0)
            oldUnionSwitches.Add(oldsw);
            dfe *outarg= FindDFE(j, arg, outputVector,heap);
            if ( outarg )
            {
                newNonGBVec.Add(outarg);
                newSwitch->AddArg(outarg);
            }
            else
                {
                newGBColSwitches.Clear( );
                newAggSwitches.Clear( );
                return HOS_FALSE; // could not find arg
            }
        }
// the top aggregation looks like sum(switch(a,b))
        for (x=0; x< NAggs; x++)
    {
        dfe_SetFunction *sf = static_cast(dfe_SetFunction *,
                    gb->GetAggVector( )->GetObjectAtIndex(x));
        dfe_Switch *newSwitch =static_cast(dfe_Switch *,
                    newAggSwitches.GetObjectAtIndex(x));
        if (sf->IsKindOf(CLASS_dfe_CountAggregate) &&
            sf->GetIsCountStar( ))
```

-continued

COMPUTER PROGRAM LISTING APPENDIX

```
                                        {
                                            // get handle from UnionAll Node
                                                hos_uint handle = UnionNode->GetQueryBlockID(j);
                                            DF_ASSERT(handle);
                                            dfe_CountAggregate *newCount =
HOS_NEWPERM( "splitGroupby",
                                                            dfe_CountAggregate,
                                                                    ( ));
                                            newCount->SetIsCountStar(sf->GetIsCountStar( ));
                                            newCount->SetIsDistinct(sf->GetIsDistinct( ));
                                            newCount = static_cast(dfe_CountAggregate *,
                                                        heap->AddToHeap(newCount, handle));
                                            newAggVec.Add(newCount);
                                            newSwitch->AddArg(newCount);
                                        }
                                        else
                                        {
                                            dfe *oldDFE = sf->GetDFEArg(0);
                                            dfe *switchDfe =0;
                                            hos_boolean otherExpr = HOS_FALSE;
                                                dfe *otherExprDFE =0;
                                            if (OldDFE->IsKindOf(CLASS_dfe_Switch))
                                                switchDfe = oldDFE;
                                            else if (OldDFE->IsKindOf(CLASS_dfe_VirtualColumn))
                                                {
                                            dfe_VirtualColumn *vcol=
static_cast(dfe_VirtualColumn *,
                                                            oldDFE);
                                                switchDfe = vcol->GetSelectDFE( );
                                            }
                                        else
                                        {
                                            dfe *vcol = oldDFE->FindUniqueVirtualColumn( );
                                            if (vcol)
                                            {
                                                otherExprDFE = oldDFE;
                                                switchDfe=vcol->FindUniqueSwitch( );
                                                oldDFE = vcol;
                                                otherExpr = HOS_TRUE;
                                            }
                                            else
                                            {
                                                newGBColSwitches.Clear( );
                                                newAggSwitches.Clear( );
                                                return HOS_FALSE; // could not find arg
                                            }
                                            }
                                        if (!switchDfe)
                                            return HOS_FALSE; // could not find switch
                                                    DF_ASSERT(switchDfe->IsKindOf(CLASS_dfe_Switch));
                                        if (j==0) // only add switche once
                                            oldUnionSwitches.Add(switchDfe);
                                        dfe *arg1 = FindDFEFromSwitch(j, switchDfe,
                                                        outputVector);
                                        if (!arg1)
                                        {
                                            newAggswitches.Clear( );
                                            newGBColSwitches.Clear( );
                                            return HOS_FALSE;
                                        }
                                        hos_uint qhandle = UnionNode->GetQueryBlockID(j);
                                        DF_ASSERT(qhandle);
                                        dfe_SetFunction *newsf =0;
                                        if (otherExpr)
                                            {
                                                dfe *newOtherExprDFE = static_cast(dfe *,
                                                heap->RecursivelyCopyReplacingEvaluable(otherExprDFE,
                                                            oldDFE, arg1, qhandle));
                                                    DF_ASSERT(newOtherExprDFE != otherExprDFE);
                                                    arg1 = newOtherExprDFE;
                                            }
                                        if (sf->IsKindOf(CLASS_dfe_SumAggregate))
                                            newsf = heap->GenerateSum(arg1);
                                        else if (sf->IsKindOf(CLASS_dfe_CountAggregate))
                                            newsf= HOS_NEWPERM("splitGroupby",
                                                        dfe_CountAggregate, (arg1));
                                        else if (sf->IsKindOf(CLASS_dfe_MinMaxAggregate))
```

-continued

COMPUTER PROGRAM LISTING APPENDIX

```
                    {
                        newsf= HOS_NEWPERM ( "splitGroupby",
                                dfe_MinMaxAggregate,
                                ((static_cast(dfe_MinMaxAggregate *,
                                    sf))->GetOperation( ), arg1));
                    }
                    else if (sf->IsKindOf(CLASS_dfe_AnyAggregate))
                    {
                        newsf= HOS_NEWPERM( "splitGroupby",
                                dfe_AnyAggregate,
                                (arg1));
                    }
                    else if (sf->IsKindOf(CLASS_dfe_GroupingAggregate))
                    {
                        DF_THROW(DF_PROGERROR);
                    }
                    newsf = static_cast(dfe_SetFunction *,
                                    heap->AddToHeap(newsf, qhandle));
                    newAggVec.Add(newsf);
                    newSwitch->AddArg(newsf);
                }
            } // loop through original agg vector
            // using new gb and new agg vector to create new gb node and
            // insert it to the child of union node.
            // Get group by algorithm
            dfo_GroupBy *newGBNode=0;
            if (gb->IsKindOf(CLASS_dfo_GroupByUnordered))
                newGBNode = HOS_NEWPERM("SplitGroupBy",
                                    dfo_GroupByUnordered,
                                    (GetHeap( ), UnionArm,
                                    &newAggVec, &newGBVec,
                                    &newNonGBVec));
            else if (gb->IsKindOf(CLASS_dfo_GroupBySingle))
                newGBNode = HOS_NEWPERM( "SplitGroupBy",
                                    dfo_GroupBySingle,
                                    (GetHeap( ), UnionArm,
                                    &newAggVec, &newGBVec,
                                    &newNonGBVec));
                if (insertUnderStore)
                    {
                    if (parentOfNewGb->IsKindOf(CLASS_dfo_Store))
                    parentOfNewGb->SetChild(newGBNode,0);
                    else
                    parentOfNewGb->SetChild(newGBNode,j);
                    }
                else
                    UnionNode->SetChild(newGBNode, j);
                newGBNode->GatherDetailCardinalityEstimates( );
            }
            // replace top groupby agg Function arg
            // for example, sum(switch(a,b)) to sum(switch(sum(a),
sum(b)))
            // newAggSwitches Should replace the Union Node swithes and
            // top GB swithes.
            hos_vector castVector;
            hos_vector aggSwitches(newAggSwitches);
            for (z=0; z < aggSwitches.Entries( ); z++)
            {
                dfe *newSum;
                dfe_Switch *swDFE = static_cast(dfe_Switch *,
                                        aggSwitches.GetObjectAtIndex(z));
                hos_uint qhandle=0;
                if (NAggs)
                    qhandle = (static_cast(dfe *, gb->GetAggVector( )-
>GetObjectAtIndex(0)))->GetHandle( );
                else if (NGbKeys)
                    qhandle = (static_cast(dfe *, gb->GetGroupVector( )-
>GetObjectAtIndex(0)))->GetHandle( );
                swDFE = static_cast(dfe_Switch *, heap-
>AddToHeap(swDFE,qhandle));
                // Now the heap owns the switch
                newAggSwitches.Remove(SwDFE, HOS_TRUE);
                swDFE->TypeCheck(heap);
                swDFE->SetSwitchIndexPtr(UnionNode->GetFetchRoutePointer( ));
                dfe_SetFunction *oldTopSf = static_cast(dfe_SetFunction *,
                                        gb->GetAggVector( )-
```

-continued

COMPUTER PROGRAM LISTING APPENDIX

```
>GetObjectAtIndex(z));
                    if (swDFE->GetDFEArg(0)->IsKindOf(CLASS_dfe_CountAggregate))
                    {
                        // The Top group by must sum the counts and
                        // cast the sum to a count return type
                        newSum = heap->GenerateSum(swDFE);
                        newSum = static_cast(dfe *,
                                        heap->AddToHeap(newSum, qhandle));
                        replacementVector.Add(newSum);
                        dfe *newCast = HOS_NEWPERM("parallelize", dfe_Cast,
                                        (newSum,
                                        0,
                                        oldTopSf->GetDataType( ),
                                        oldTopSf->GetMaxDataLength( ),
                                        oldTopSf->GetPrecision( ),
                                        oldTopSf->GetScale( ),
                                        oldTopSf->IsUnscaledInteger( )));
                        newCast->SetMaxPrec(oldTopSf->GetMaxPrec( ));
                        newCast->SetMaxBits(oldTopSf->GetMaxBits( ));
                        newCast = static_cast(dfe *,
                                        heap->AddToHeap(newCast, qhandle));
                        castVector.Add(newCast);
                    }
                    else if (swDFE->GetDFEArg(0)-
>IsKindOf(CLASS_dfe_SumAggregate))
                    {
                        newSum = heap->GenerateSum(swDFE);
                        newSum = static_cast(dfe *,
                                        heap->AddToHeap(newSum, qhandle));
                        replacementVector.Add(newSum);
                        if (!newSum->IsIdenticalDatumType(oldTopSf))
                        {
                            dfe *newCast = HOS_NEWPERM("parallelize", dfe_Cast,
                                        (newSum,
                                        0,
                                        oldTopSf->GetDataType( ),
                                        oldTopSf->GetMaxDataLength( ),
                                        oldTopSf->GetPrecision( ),
                                        oldTopSf->GetScale( ),
                                        oldTopSf->IsUnscaledInteger( )));
                            newCast->SetMaxPrec(oldTopSf->GetMaxPrec( ));
                            newCast->SetMaxBits(oldTopSf->GetMaxBits( ));
                            newCast = static_cast(dfe *,
                                        heap->AddToHeap(newCast, qhandle));
                            castVector.Add(newCast);
                        }
                    }
                    else if (swDFE->GetDFEArg(0)-
>IsKindOf(CLASS_dfe_MinMaxAggregate))
                    {
                        dfe_MinMaxAggregate *newMinMax =
                            HOS_NEWPERM("parallelize",
                                        dfe_MinMaxAggregate,
                                        ((static_cast(dfe_MinMaXAggregate *,
                                        swDFE->GetDFEArg(0)))->GetOperation( ),
                                        swDFE));
                        newMinMax = static_cast(dfe_MinMaxAggregate *,
                                        heap->AddToHeap(newMinMax,
                                                qhandle));
                        replacementVector.Add(newMinMax);
                    }
                    else if (swDFE->GetDFEArg(0)-
>IsKindOf(CLASS_dfe_AnyAggregate))
                    {
                        dfe_AnyAggregate *newAny =
                            HOS_NEWPERM("parallelize",
                                        dfe_AnyAggregate,
                                        (swDFE));
```

-continued

COMPUTER PROGRAM LISTING APPENDIX

```
                    newAny = static_cast(dfe__AnyAggregate *,
                                        heap->AddToHeap(newAny,
                                                        qhandle));
                    replacementVector.Add(newAny);
                }
                else
                {
                    DF_THROW(DF_PROGERROR);
                }
            } // create new agg function for top GB
                hos_vector colSwitches(newGBColSwitches);
                for (z=0, z < colSwitches.Entries( ), z++)
                {
                    dfe__Switch *swDFE = static_cast(dfe__Switch *,
                                           colSwitches.GetObjectAtIndex(z));
                    hos_uint qhandle=0;
                    if (NGbKeys)
                        qhandle = (static_cast(dfe *,
                                       gb->GetGroupVector( )->GetObjectAtIndex(0)))-
>GetHandle( );
                    swDFE = static_cast(dfe__Switch *, heap-
>AddToHeap(swDFE,qhandle));
                    // Now the heap owns the switch
                    newGBColSwitches.Remove(SwDFE, HOS_TRUE);
                    swDFE->TypeCheck(heap);
                    swDFE->SetSwitchIndexPtr(UnionNode->GetFetchRoutePointer( ));
                    colSwitches.ReplaceObjectAtIndex(z, swDFE);
                }
                hos_vector oldVector;
                for (x=0; x<aggSwitches.Entries( ); x++)
                    colSwitches.Add(aggSwitches.GetObjectAtIndex(x));
                // in Count(*) and AVG Count case there is no old switches
                // entry in UnionAll should insert a new switches
                UnionNode->ReplaceSwitches(&oldUnionSwitches, &colSwitches);
                oldVector.Append(*gb->GetAggVector( ));
                oldVector.Append(*gb->GetGroupVector( ));
                oldVector.Append(*gb->GetNonGroupVector( ));
                for (z=0; z< (NGbKeys+NNonKeys); z++)
                    replacementVector.Add(colSwitches.GetObjectAtIndex(z));
                gb->ReplaceWithSwitches(&replacementVector);
                for (z=0; z < castVector.Entries( ); z++)
                {
                    dfe *DFE = static_cast(dfe *,
castVector.GetObjectAtIndex(z));
                    dfe *argDFE = DFE->GetDFEArg(0);
                    hos_int index = replacementVector.Find(argDFE,HOS_TRUE);
                    replacementVector.ReplaceObjectAtIndex(index, DFE);
                }
                if (oldVector.Entries( ) > 0)
                    root->RecursivelyReplaceDFEs(&oldVector,&replacementVector);
                // set flag on top GB node. To print out the message
                    gb->SetIsSplit( );
                return HOS_TRUE;
            }
            else
                return SplitGroupByAcrossUnion(child, heap, root);
        }
        else
            return SplitGroupByAcrossUnion(child, heap, root);
    }
    return HOS_FALSE;
}
```

What is claimed is:

1. In a database system having a plurality of separate database tables, an improved method for query processing, the method comprising:

receiving a query requesting grouping of data from a plurality of separate database tables;

parsing said query to generate a query tree;

for each union node of said query tree, determining whether it is advantageous to transform said union node; and for each said union node for which transformation is determined to be advantageous, transforming said union node by inserting grouping operators as children of said union node, said grouping operators enabling parallel processing of said plurality of separate database tables.

2. The method of claim 1, wherein said query requesting grouping of data includes a query using a Structured Query Language (SQL) GroupBy operator.

3. The method of claim 1, wherein said query requesting grouping of data includes a query requesting summarization of data from a plurality of separate database tables.

4. The method of claim 1, wherein said step of inserting grouping operators as children of said union node includes inserting an analog into each said grouping operator, said analog aggregating results from an arm of said union node.

5. The method of claim 1, wherein said step of transforming said union node includes replacing aggregate expressions in said union node with new composite expressions, said new composite expressions synthesizing results from each said grouping operator.

6. The method of claim 1, wherein said each union node includes a Structured Query Language (SQL) UnionAll operator.

7. The method of claim 1, wherein said step of determining whether it is advantageous to transform said union node includes determining whether a grouping operator is immediately above said union node in said query tree.

8. The method of claim 1, wherein said step of determining whether it is advantageous to transform said union node includes determining whether said union node is distinct.

9. The method of claim 1, wherein said step of determining whether it is advantageous to transform said union node includes evaluating availability of sufficient system resources to process multiple arms of said union node in parallel.

10. The method of claim 9, wherein said step of evaluating availability of sufficient system resources includes evaluating available memory.

11. The method of claim 9, wherein said step of evaluating availability of sufficient system resources includes evaluating available processing resources.

12. The method of claim 1, wherein said step of determining whether it is advantageous to transform said union node includes determining if grouping expressions are individual columns.

13. The method of claim 1, further comprising:
after transformation of all union nodes that may be advantageously transformed, executing said query tree to generate query results.

14. The method of claim 1, further comprising:
examining each grouping operator to determine if it is advantageous to use an index-only query execution plan for processing said each grouping operator; and
substituting an index-only query execution plan when it is determined to be advantageous.

15. The method of claim 1, further comprising:
individually optimizing said query for each separate database table.

16. A database system providing improved methods for processing a request for grouping of data from a plurality of database tables, said system comprising:
a parser and normalizer module for receiving and parsing a request for grouping of data from a plurality of database tables;
an optimizer module for converting said request into a logical tree;
a transformation module for traversing said logical tree, examining each union node of said logical tree to determine if transformation of said union node is advantageous, and transforming each said union node of said logical tree for which transformation is determined to be advantageous by inserting grouping operators as children of said union node, said grouping operators enabling parallel processing of said plurality of separate database tables; and
an execution module for execution of said logical tree against said plurality of separate database tables after transformation of said logical tree by said transformation module.

17. The system of claim 16, wherein said database system is a relational database system.

18. The system of claim 16, wherein said transformation module determines an optimal query execution plan for each separate database table.

19. The system of claim 16, wherein said request for grouping of data includes a query using a Structured Query Language (SQL) GroupBy operator.

20. The system of claim 16, wherein said request for grouping of data includes a query requesting summarization of data from a plurality of separate database tables.

21. The system of claim 16, wherein said transformation module inserts an analog into each said grouping operator, said analog aggregating results from a child of said union node.

22. The system of claim 16, wherein said transformation module replaces aggregate expressions in said union node with new composite expressions, said new composite expressions synthesizing results from each said grouping operator.

23. The system of claim 16, wherein said each union node includes a Structured Query Language (SQL) UnionAll operator.

24. The system of claim 16, wherein said transformation module determines whether it is advantageous to transform said union node by evaluating whether a grouping operator is immediately above said union node in said logical tree.

25. The system of claim 16, wherein said transformation module determines whether it is advantageous to transform said union node by evaluating whether said union node is distinct.

26. The system of claim 16, wherein said transformation module determines whether sufficient system resources are available to process multiple arms of said union node in parallel.

27. The system of claim 26, wherein said transformation module determines available cache memory.

28. The system of claim 26, wherein said transformation module determines available processing resources.

29. The system of claim 16, wherein said transformation module determines whether it is advantageous to transform said union node by evaluating if grouping expressions are individual columns.

30. The system of claim 16, wherein said transformation module traverses said logical tree for all union nodes that may be advantageously transformed.

31. The system of claim 16, wherein said transformation module examines each grouping operator inserted into said logical tree to determine if it is advantageous to use an index-only query execution plan for processing said each grouping operator.

32. The system of claim 31, wherein said transformation module substitutes an index-only query execution plan for process said each grouping operator when it is determined to be advantageous.

33. In a database system having a plurality of database tables, an improved method for query processing, the method comprising:
receiving a query requesting grouping of data from a plurality of database tables;
in response to said query, concurrently scanning data in each database table in said plurality of database tables;
grouping data and generating summary results in parallel for each database table in said plurality of database tables; and merging said summary results from said plurality of database tables to produce a final aggregation result.

34. The method of claim 33, wherein said database system includes a relational database system.

35. The method of claim 33, wherein said query requesting grouping of data includes a query using a Structured Query Language (SQL) GroupBy operator.

36. The method of claim 33, wherein said query requesting grouping of data includes a query requesting summarization of data from a plurality of separate database tables.

37. The method of claim 33, wherein said step of grouping data and generating summary results in parallel includes inserting grouping operators as children of each union operator in said query for aggregating results from each arm of said union operator.

38. The method of claim 37, wherein inserting grouping operators as children of said union operator includes inserting an analog into each said grouping operator, each said analog aggregating results from an arm of said union operator.

39. The method of claim 37, wherein inserting grouping operators as children of said union operator includes replacing aggregate expressions in said union operator with new composite expressions, said new composite expressions synthesizing results from each said grouping operator.

40. The method of claim 33, further comprising:
determining whether it is advantageous to group data and generate summary results in parallel and only grouping data and generating summary results in parallel when it is determined to be advantageous.

41. The method of claim 40, wherein said step of determining whether it is advantageous to group data and generate summary results in parallel includes determining available processing resources.

42. The method of claim 40, wherein said step of determining whether it is advantageous to group data and generate summary results in parallel includes determining available memory.

43. The method of claim 40, wherein said step of determining whether it is advantageous to group data and generate summary results in parallel includes evaluating if grouping expressions are individual columns.

44. The method of claim 33, further comprising:
optimizing said query for each database table individually.

45. The method of claim 44, wherein optimizing said query for each database table individually includes using an index-only query execution plan for processing said each database table.

46. The method of claim 33, wherein said step of merging said summary results from said plurality of database tables to produce a final aggregation result includes the substeps of:
merging said summary results using a union operator to create aggregated results; and
grouping said aggregated results into a final aggregation result using a grouping operator.

* * * * *